United States Patent
Gritter et al.

(10) Patent No.: US 9,417,989 B2
(45) Date of Patent: *Aug. 16, 2016

(54) MULTI-THREADED DEBUGGER SUPPORT

(71) Applicant: International Business Machines Corporation, Armonk, NY (US)

(72) Inventors: Daniel S. Gritter, Wappingers Falls, NY (US); MeiHui Wang, Brookfield, CT (US); Joshua Wisniewski, Elizaville, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/106,894

(22) Filed: Dec. 16, 2013

(65) Prior Publication Data

US 2014/0109064 A1   Apr. 17, 2014

Related U.S. Application Data

(63) Continuation of application No. 11/962,647, filed on Dec. 21, 2007, now Pat. No. 8,739,133.

(51) Int. Cl.
*G06F 9/44* (2006.01)
*G06F 11/36* (2006.01)

(52) U.S. Cl.
CPC .......... *G06F 11/3636* (2013.01); *G06F 11/364* (2013.01); *G06F 11/3648* (2013.01)

(58) Field of Classification Search
None
See application file for complete search history.

(56) References Cited

U.S. PATENT DOCUMENTS

| | | | |
|---|---|---|---|
| 5,953,530 A | 9/1999 | Rishi et al. | 717/127 |
| 6,158,045 A | 12/2000 | You | 717/124 |
| 6,347,335 B1 | 2/2002 | Shagam et al. | 709/223 |
| 6,493,837 B1 * | 12/2002 | Pang et al. | 714/45 |
| 6,587,967 B1 | 7/2003 | Bates et al. | 714/35 |
| 6,718,484 B1 | 4/2004 | Kodera | |
| 6,978,444 B1 | 12/2005 | Farchi et al. | |
| 6,988,264 B2 | 1/2006 | Sarma et al. | |
| 7,370,171 B1 * | 5/2008 | Jeyaram | 711/170 |

(Continued)

OTHER PUBLICATIONS

Johnny Roberts, TPF/GI, TPF Software Inc., 2001, 6 pges.

(Continued)

*Primary Examiner* — Lewis A Bullock, Jr.
*Assistant Examiner* — Christine Dang
(74) *Attorney, Agent, or Firm* — Fleit Gibbons Gutman Bongini Bianco PL; Thomas S. Grzesik

(57) ABSTRACT

A method and information processing system facilitate debugging of a multi-threaded application. A control program request associated with at least one thread of a process that has been designated for debugging is generated. The control program request is placed into a memory buffer associated with the thread by the debugger. The memory buffer is passed to a control program. A plurality of memory buffers is monitored. Each memory buffer in the plurality of memory buffers is associated with a different thread of the process. At least one memory buffer in the plurality of memory buffers is determined to include debugging event information from the control program determining. The debugging event information is processed. The processing includes at least one of notifying a user of the debugging event information and generating at least one control program request for a thread associated with the at least one memory buffer.

7 Claims, 5 Drawing Sheets

(56) References Cited

U.S. PATENT DOCUMENTS

| | | |
|---|---|---|
| 7,685,575 B1 | 3/2010 | Fareed .......................... 717/131 |
| 7,865,883 B1 | 1/2011 | Sistare et al. .................. 717/129 |
| 2004/0117620 A1 | 6/2004 | Rothrock ...................... 713/164 |
| 2005/0235136 A1 | 10/2005 | Barsotti et al. ..................... 713/1 |
| 2005/0246691 A1 | 11/2005 | Hsieh et al. ................... 717/129 |
| 2006/0136916 A1 | 6/2006 | Rowland et al. ............. 718/100 |
| 2006/0143531 A1 | 6/2006 | Kilian et al. ..................... 714/38 |
| 2007/0028240 A1 | 2/2007 | Hayakawa .................... 718/100 |
| 2007/0101327 A1 | 5/2007 | Burdick et al. |
| 2007/0113218 A1* | 5/2007 | Nolan et al. ................... 717/124 |
| 2007/0150867 A1 | 6/2007 | Barsness et al. .............. 717/124 |
| 2007/0168741 A1 | 7/2007 | Chadha et al. |
| 2008/0104369 A1* | 5/2008 | Reed ................................ 712/28 |

OTHER PUBLICATIONS

Mike Wang, The TPF Debugger, 2002, 18 pges., IBM.
Josh Wisniewski, TPF Debugger TPF Views, IBM z/Transaction Processing Facility Enterprise Edition 1.1.0, Spring 2007, 34 pges., Las Vegas, Nevada.

* cited by examiner

MULTI-THREADED DEBUGGER SUPPORT

CROSS-REFERENCE TO RELATED APPLICATIONS

This application is a continuation of and claims priority to U.S. patent application Ser. No. 11/962,647 (now U.S. Pat. No. 8,739,133) filed on Dec. 21, 2007, the entire contents of which are incorporated herein by reference.

FIELD OF THE INVENTION

The present invention generally relates to the field of multi-threaded operating environments, and more particularly relates to providing multi-threaded debugger support within such environments.

BACKGROUND OF THE INVENTION

Multi-processor operating environments such as the Transaction Processing Facility ("TPF") operating environment sold by International Business Machines of Armonk, N.Y. provide an execution environment for multi-threaded applications. During development of these applications, developers use a debug program (debugger) to control the flow of application program execution and to inspect aspects of programs. Debugging of programs may be done either manually or interactively by a debugging system mediated by a computer system. Manual debugging of a program requires a programmer to manually trace the logic flow of the program and the contents of memory elements, e.g., registers and variables. In the interactive debugging of programs, the program is executed under the control of a monitor program (known as a "debugger"), commonly located on and executed by the same computer system on which the program is executed.

Most debugging programs run in the application process, i.e., on the application Program Control Block ("PCB"). One problem with these types of debuggers is that by running in the application process, the memory required for the application is dramatically increased. This implicitly changes the operation and setup of the application (foot print). The TPF operating environment, on the other hand, provides a debugger referred to as the TPF debugger that operates in its own process that is separate from the application process. In operating environments such as the TPF environment problems can be encountered when trying to debug a multi-threaded application.

One solution for debugging multi-threaded application in a TPF environment is to allocate a single instance of the TPF debugger to each thread. However, this solution requires a large number of resources. Another solution is to instantiate the TPF debugger as part of the application process. However, the advantages of operating the TPF debugger outside of the application process would then be lost.

Therefore a need exists to overcome the problems with the prior art as discussed above.

SUMMARY OF THE INVENTION

A method for facilitating debugging of a multi-threaded application is disclosed. The method includes generating a control program request associated with at least one thread of a process that has been designated for debugging. The control program request is placed into a memory buffer associated with the thread by the debugger. The memory buffer is passed to a control program. A plurality of memory buffers is monitored. Each memory buffer in the plurality of memory buffers is associated with a different thread of the process. The method further includes determining whether at least one memory buffer in the plurality of memory buffers includes debugging event information from the control program determining in response to the monitoring. The debugging event information is processed in response to determining that at least one memory buffer in the plurality of memory buffers includes debugging event information from the control program. The processing includes at least one of notifying a user of the debugging event information and generating at least one control program request for a thread associated with the at least one memory buffer.

In another embodiment, a method for managing debugging requests associated with a multi-threaded application is disclosed. The method includes receiving, from a debugger, at least one memory buffer associated with a thread of a process that has been designated for debugging. The memory buffer includes a control program request. An action associated with the control program request is identified for performing on the thread. The action is performed on the thread. Debugging event information comprising results associated with performing the action is generated. The debugging event information is inserted into the message buffer associated with the thread. The memory buffer is passed to the debugger.

In yet another embodiment, an information processing system for facilitating debugging of a multi-threaded application is disclosed. The information processing system includes a memory and a processor that is communicatively coupled to the memory. A debugger is communicatively coupled to the memory and the processor. The debugger is adapted to generate a control program request associated with at least one thread of a process that has been designated for debugging. The control program request is placed into a memory buffer associated with the thread by the debugger. The memory buffer is passed to a control program. A plurality of memory buffers is monitored. Each memory buffer in the plurality of memory buffers is associated with a different thread of the process. The debugger is further adapted to determine whether at least one memory buffer in the plurality of memory buffers includes debugging event information from the control program. The debugging event information is processed in response to determining that at least one memory buffer in the plurality of memory buffers includes debugging event information from the control program. The processing includes at least one of notifying a user of the debugging event information and generating at least one control program request for a thread associated with the at least one memory buffer.

One advantage of the various embodiments of the present invention is that multi-threaded application debugger support is presented. The various embodiments preserve an application's foot print and reduce the possibility of a debugger inadvertently introducing bugs into the application. This is because the debugger remains in a separate process than the application. Each thread in the process is controlled by a separate memory buffer interface such as (but not limited to) a glue interface to a control program, whereas many debuggers require all threads to be simultaneously stepped at the same time and may also only allow individual threads to be individually debugged. The various embodiments allow a user to simply step, run, pause, and etc. any given thread at any given time regardless of the execute commands given to the other threads.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Computing Environment

Figure 1:
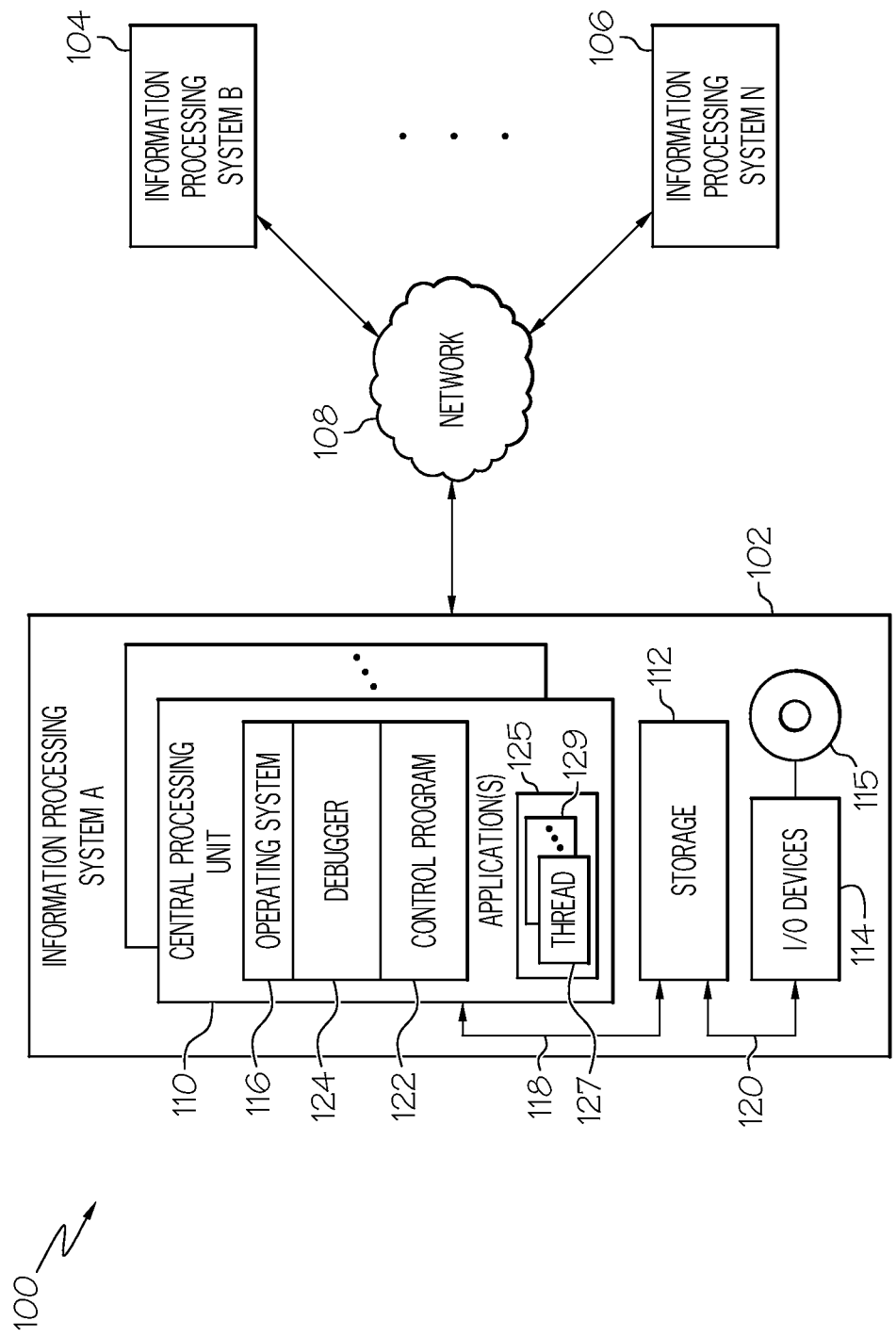
FIG. 1 is a block diagram illustrating one example of a computing environment, according to one embodiment of the present invention.

FIG. 1 is a block diagram illustrating one example of an environment 100 for facilitating the debugging of a multi-threaded application. In particular, FIG. 1 shows a plurality of information processing systems 102, 104, 106 communicatively coupled to each other via a network 108. The network 108, in one embodiment, is a wired or wireless network. Each of the information processing systems 102, 104, 106 can include one or more central processing units ("CPUs") 110, storage 112, and one or more input/output devices 114. The information processing systems 102, 104, 106, in one embodiment, can be part of a distributing processing environment that shares resources and job processing amongst available CPUs. The CPU 110, in one embodiment, may also include one or more applications 125. These applications can be multi-threaded thereby comprising multiple threads 127, 129, or single threaded.

A CPU 110 includes the sequencing and processing facilities for instruction execution, interruption action, timing functions, initial program loading and other machine related functions. In one embodiment, the CPU 110 executes an operating system 116, such as, for instance, the Transaction Processing Facility ("TPF") offered by International Business Machines Corporation. The TPF operating system controls the execution of transactions and/or programs running within the system and the processing of data. One example of TPF is described in detail in the IBM TPF Product Information Center, which can be found at [http://publib.boulder.ibm.com/infocenter/tpfhelp/current/index.jsp and http://www-306.ibm.com/software/htp/tpf/pubs/tpfpubs.htm#] each of which is hereby incorporated herein by reference in their entirety. In particular, the TPF operating system that works with application programs to process transactions for customers in a real-time environment. For example, the TPF system can be used for computing needs such as transaction processing, network switching, and front-end processing.

The CPU 102 is coupled via, for example, a bidirectional bus 118, to storage 112 such as (but not limited to) memory. Storage 112 is, for instance, directly addressable and provides for high-speed processing of data by the CPU(s) 102. The storage 112 can be physically integrated with the CPU(s) or constructed as stand-alone units. The storage 112 is further coupled via, for instance, a bidirectional bus 120, to input/output devices 114. The input/output devices 114 can include, for instance, printers, magnetic tape units, direct access storage devices ("DASD"), displays, keyboards, communication controllers, teleprocessing devices, and optical and sensor-based equipment. Data is transferred from the storage 112 to I/O devices 114 and from the I/O devices 114 back to storage 112 via known input/output commands. One specific type of data storage device is a computer readable medium, such as an optically readable disk such as (but not limited to) a CD 115 or DVD, which may be encoded with a program.

In one embodiment, the operating system 116 includes a control program 122, which performs many of the control functions associated with an operating system 116. Coupled to the control program 122 is at least one debugger 124. It should be noted that in some environments such as a Transaction Processing Facility ("TPF") the control program 122 and operating system 116 are one in the same. A debugger 124 can be implemented in software, hardware, microcode or any combination thereof. In one embodiment, the debugger 124 is sold as a package with the TPF operating system of International Business Machines Corporation.

Although the debugger 124 is shown as part of the operating system 116, this is not necessary. A portion or all of the debugger may be separate from the operating system. The operating system 116 may also include various other programs/tools that need not be described for the various embodiments of the present invention. It should be noted that the above-described computing environment is only one example. The capabilities of the present invention can be used with many other computing environments without departing from the spirit of the present invention. For example, the capabilities of the present invention can be used with Windows NT, AIX or other systems.

Debugging Support For Multi-Threaded Applications

The following is a brief overview of the debugger 124 discussed above and its multi-threaded application debugging abilities. As discussed above, the debugger 124, in one embodiment, is a TPF debugger 124. The debugger 124 in this embodiment operates as a single process (i.e., no threads) and manages all threads in an application process. The debugger 124 maintains a list of blocks (e.g., glue blocks) that tie the individual threads of an application to the debugger process. The debugger 124 uses the glue blocks to send and receive messages to the control program 122 to control how the application is executing at least one execute type operation selected from the group of execute type operations consisting of run, run with variety of breakpoints and breakpoint types, run with watchpoints/heap corruption detection, stop on next function, stop on all functions, step-into, step-over, step-return, step debug/filtering, step exception, run exception, examine exception, run to program trap (ctest), run with trace, fork follow child, fork follow parent, jump, halt, detach from process, join a process, and terminate. The debugger 124 processes the glue block for each thread in a circular one by one approach. In addition to this processing, the debugger 124 optionally monitors and processes TCP/IP requests from a remote GUI over a communication socket in the same processing loop. It should be noted that the present invention is not limited to a remote GUI or TCP/IP and is applicable to a local GUI and or any other networking protocol as well. This processing loop or selecting loop, behaves similar to a dispatcher with respect to the next piece of work for the debugger 124 to perform. Prior to processing a piece of work, the environment (glue block, UCAB, UTCB, etc.) is set up such that any other piece of code in the debugger that is called can be written without knowledge of the threaded environment. That is, only the selected loop has knowledge of the threaded environment.

This manner of debugging a multi-threaded application preserves the application's foot print and reduces the possibility of the debugger 124 inadvertently introducing bugs into the application (because the debugger 124 remains in a separate process). The debugger 124 provides great levels of debugging flexibility as each thread in the process is controlled by a separate glue interface to the control program 122, whereas many debuggers require all threads to be simultaneously stepped at the same time. Most other debuggers provide a mechanism to freeze and thaw individual thread. The debugger 124 of the various embodiments of the present invention, on the other hand, allows the user to simply step, run, pause, and etc any given thread at any given time regardless of the execute commands given to the other threads. The basic infrastructure is written to insure most code in the debugger 124 can be written without knowledge of the threaded environment. This infrastructure allows the debugger 124 to have minimal locking and to avoid most complications of writing and debugging threaded code. This infrastructure also allows the debugger 124 to keep single sets of information about the application process such as Module, Part, and function addresses, thereby reducing resources necessary for the debugger 124 to track.

Figure 2:
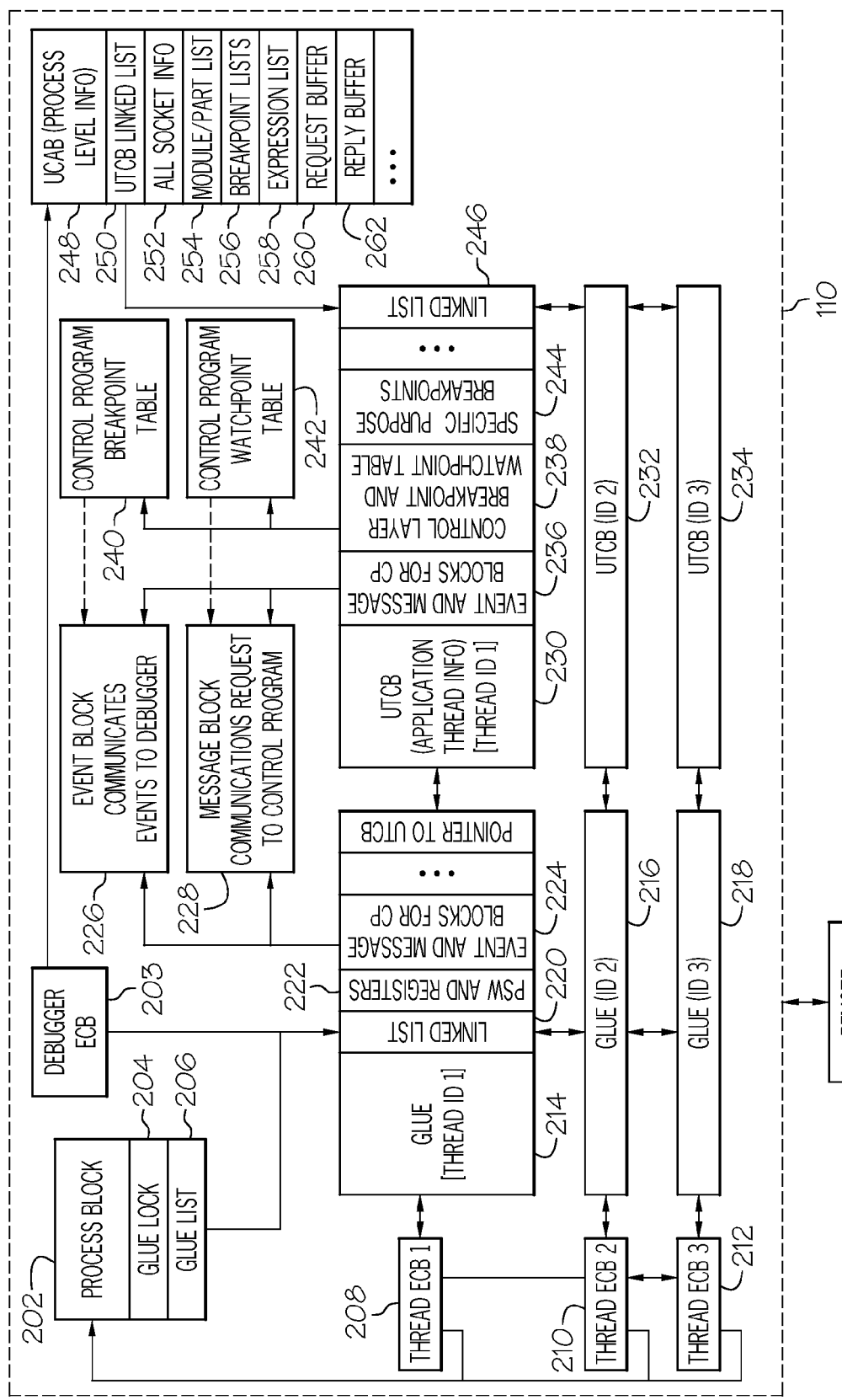
FIG. 2 is a block diagram illustrating one configuration of a debugging environment for debugging a multi-threaded application according to one embodiment of the present invention.

FIG. 2 shows one configuration of the debugger 124 for debugging a multi-threaded application. FIG. 2 shows a process block or application storage block (i.e., PCB) 202 that is associated with an application that is to be debugged. FIG. 2 shows also shows a separate debugger PCB 203 that is associated with the debugger 124 of FIG. 1. The process block 202 comprises a glue lock 204 and a glue list 206. Each of these components is discussed in greater detail below. As stated above, the application to be debugged is a multi-threaded application, therefore, the process block is communicatively coupled to a plurality of thread storage blocks or PCBs 208, 210, 212. Each of the thread PCBs 208, 210, 212 are associated with a glue block 214, 216, 218 that is referenced by the glue list 206. Each of the glue blocks 214, 216, 218 is a global memory space that is also communicatively coupled to the process block 202 and the debugger PCB 203. The glue blocks 214, 216, 218 act as a messaging buffer interface for communicating messages between the debugger PCB 203 and the control program 122. The glue blocks 214, 216, 218 include, among other things, register values, state values, and other information that is communicated between the debugger PCB 203 and the control program 122.

The glue block list 206 ties the debugger PCB 203 to each thread PCB 208, 210, 212 in the application process. The glue blocks 214, 216, 218, in one embodiment, are logically arranged in a loop configuration where the debugger PCB 203 polls each glue block 214, 216, 218 to determine if an event has been associated with a particular glue block by the control program 204. This glue block selecting process is discussed in greater detail below. FIG. 2 also shows a Universal Control Access Block ("UCAB") 220, which includes process level information.

Each glue block 214, 216, 218 comprises a linked list 220 that references the glue list 204. This link list 220 is accessed by the debugger PCB 203 to determine the identity of a glue block immediately prior to the selected glue block and immediately following the selected glue block. The glue block 214, 216, 218 also includes Program Status Word and register information 220. A pointer 224 to a message block 226 and an event block 228 is also included within a glue block 214, 216, 218. The message block 226 is used by the debugger PCB 203 to communicate the desired behavior such as (but not limited to) run, step, and other similar behaviors to the control program 122 to carry out. These behaviors or debugging requests are received by the debugger PCB 203 from a user. For example, the debugger PCB 203, in one embodiment, receives TCP/IP requests from a remote GUI 205 comprising debugging requests from a user. It should be noted that the present invention is not limited to execute type functionality, but is also applicable to service type operations such as (but not limited to) systems services and macro calls as well The event block 228 communicates a state of the application such as (but not limited to) a breakpoint hit, watchpoint hit, and fork to the debugger PCB 203. Each glue block 214, 216, 218 also includes a point to a Universal Transaction Control Block ("UTCB") block 230 associated with the glue block.

A UTCB block 230 structure is created by the debugger PCB 203 when the debugger PCB 230 is first made aware of a thread PCB 208, 210, 212. When a debugger session starts, the process block 202 is analyzed and a UTCB block 230, 232, 234 is created for each thread PCB 208, 210, 212. The creation of a UTCB block 230, 232, 234 allows for a user to be immediately made aware of the existence of every thread in the process. Because of the existence of the UTCB block 230, 232, 234, the user of the debugger 124 can make requests regarding the content and states of the application thread even if it is "running". For example, a user can request to see the function/macro trace for a thread PCB 208, 210, 212 and view the contents of memory based on addresses found in the function/macro trace. At substantially the same time as creating the UTCB block 230, 232, 234, the debugger PCB 203 sets a flag in each threads such that at the next possible opportunity (e.g., leaving TPF dispatch loop) the thread stops (this is a consequence of TPF and its thread implementation). When a thread initially stops, a glue and event block is created by the control program 122 and the glue block is added to the glue list 206.

The UTCB block 230, 232, 234 is at the thread level and comprises pointers 236 to the event and message blocks 226, 228; pointers 238 to a breakpoint and watchpoint tables 240, 242; and specific purpose breakpoint information 244. The UTCB block 236 further includes a linked list 244 that is referenced by a UCAB block 248, which is discussed in greater detail below. It should be noted that the UTCB 230, 232, 234 structure comprises additional information not shown. The information discussed above within the UTCB block 230, 232, 234 is thread specific and therefore is not in the UCAB block 248, which comprises global process level information.

The UCAB block 248 includes process level information that is usually only relevant to the debugger PCB 203. Therefore, this information is not placed into the glue blocks 214, 216, 218. For example, information such as breakpoint lists 250, expressions lists 252, and other information is placed into the UCAB 248. The UCAB 248 also includes a UTCB linked list 254 (e.g., a list for the internal thread structures used to keep track of a state of individual threads, break points, variables, or other items a user wants monitored), socket information 256 (e.g. information related to a connection with a front end), a module/part list 258 (e.g., a list of all programs known by the debugger 124, a request buffer 260 (e.g., a block to store a TCP request that came from a font end), and a reply buffer 262 (e.g., a block to build a TCP reply to a TCP request for a front end). Each application PCB (i.e., process block 202) debugs a particular object. Therefore, the above UCAB information remains in the UCAB so that if different application PCBs are debugging the same program the UCAB information can be reused. Multiple copies of this information are, therefore, not required.

When the debugger PCB 203 begins processing an event or request from the remote GUI (not shown), the debugger PCB 203 sets up the debugging environment, i.e., pointers in a UCAB block 230. Then the debugger PCB 203 calls routines to complete the desired action. If the code in these routines require thread specific information found in a glue block 214, 216, 218 or UTCB block 230, 232, 234, the routine makes a call of a generic function glue( ) or UTCB( ) respectively. The glue( ) and UTCB( ) functions return the glue block 214, 216, 218 or UTCB block 230, 232, 234 for the thread currently being processed. As such, the routines used to process events and requests from the remote GUI (not shown) are coded without knowledge of the threaded environment (or if there is only one thread).

When a user sends a debugging request to the debugger PCB 203, for example, to perform a debugging operation on a thread PCB 208 the debugger PCB 203 places the request into the appropriate glue block 214. The request is communicated to the control program 122 via the message block 228. The control program 122 receives the message and analyzes the glue block 208 to generate a PER bracket for the thread PCB 208. The PER bracket, in one embodiment, is a set of control registers and address ranges used in conjunction with attribute sets. When an operation occurs in that address range as specified in the attribute set an interrupt is generated. The control program 122 uses this interrupt to create debugger event that is relayed to the debugger 203 via a glue block 214. It should be noted that a control program request or service is not limited to an execution type operation such as PER requests, but is also applicable to service type operations such as (but not limited to) systems services and macro calls as well. It should also be noted that the present invention is not limited to using a PER bracket, other mechanisms can be used as well. The control program 122 then releases the application thereby allowing the application associated with the thread PCB 208 to run. When the PER memory range is hit (the breakpoint requested by the user has been reached which occurs when the thread PCB that is executing falls into the address range specified by the PER bracket) the control program 122 puts the application to "sleep". The control program 122 then creates an event that is placed into the glue block 214 for the thread PCB 208. During the selection process of the debugger PCB 203, the debugger PCB 203 selects the glue block 208 and determines that an event exists. This event indicates to the debugger PCB 203 the state of the thread PCB 208 associated with the glue block 214. In this example, the event notifies the debugger PCB 203 that a breakpoint has been reached.

For example, the debugger PCB 203 cycles through the glue block list 206 monitoring for an event ready to be processed by the debugger PCB 203 as well as requests (on a TCP/IP socket) from the remote GUI (not shown). If the debugger PCB 203 determines that all application threads are stopped, the debugger PCB 203 goes into a glue block selecting process to identify requests coming from the remote GUI 205 (e.g., user requests such as step, run, and other similar debugging requests). If application threads are running, with no events having been presented to the debugger PCB 203, and no requests having been submitted by the user, then the debugger PCB 203 takes advantage of the sub-second sleep facility in TPF.

After a sleep interval has completed, the debugger PCB 203 cycles through the glue blocks 214, 216, 218 and any requests received from the GUI for processing. The sleep intervals gradually increase to a maximum value to accommodate for application threads waiting on a lock held by another thread currently stopped by the debugger. When an event is detected or a request is made for a stopped thread to begin executing, the sleep interval is set back to the minimum value. Since the glue block 214, 216, 218 can be updated by the control program 122 when an application has stopped and the debugger processing (looping through) the glue list, a lock 204 must be used to synchronize updates to the glue contents and glue chain. Because of the structure and design of the debugger, the glue lock 204 is the only lock required by the TPF debugger to process the multi-threaded application.

As can be seen the above manner of debugging a multi-threaded application preserves the application's foot print and reduces the possibility of the debugger 124 inadvertently introducing bugs into the application (because the debugger 124 remains in a separate process). Each thread in the process is controlled by a separate glue interface to the control program 122, whereas many debuggers require all threads to be simultaneously stepped at the same time. The debugger 124 discussed above allows the user to simply step, run, pause, and etc any given thread at any given time regardless of the execute commands given to the other threads. The infrastructure discussed above allows the debugger 124 to have minimal locking and to avoid most complications of writing and debugging threaded code.

Figure 3:
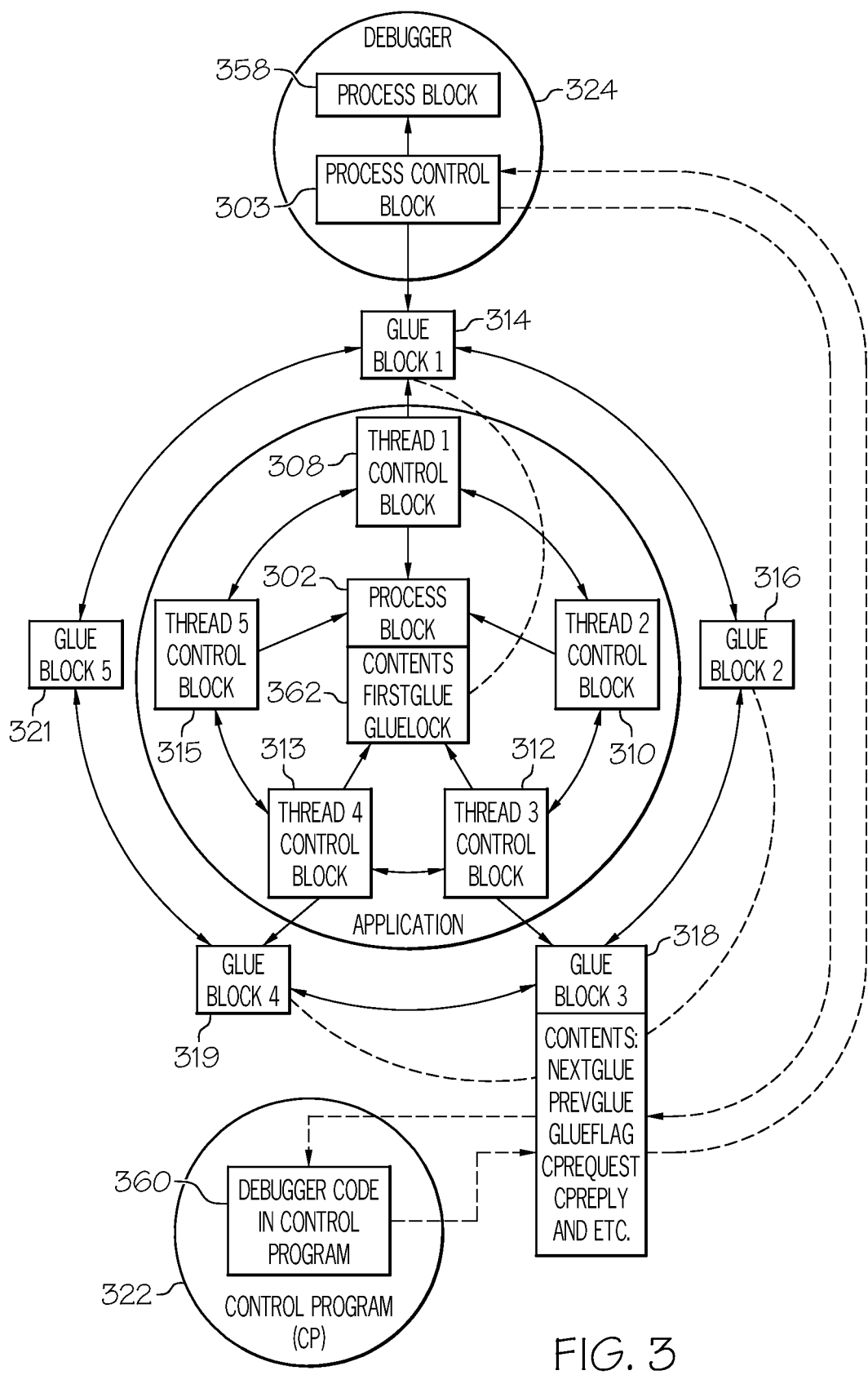
FIG. 3 is a block diagram illustrating the relationship between the components of the debugging environment of FIG. 2 according to one embodiment of the present invention.

FIG. 3 is a relational diagram illustrating the relationship among the components discussed above with respect to FIG. 2. For example, FIG. 3 shows the debugger 324 comprising a process block 358 which is a piece of memory that is shared across all threads in a process and a process control block 303 which is a thread in this example. FIG. 3 also shows the control program 322 comprising debugger code 360 for interacting with the debugger 324 and the glue blocks 314, 316, 318, 319, 321. As discussed above, each glue block 308, 310, 312, 313, 315 is associated with a thread control block 314, 316, 318, 319, 321. The thread control blocks 314, 316, 318, 319, 321 are associated with an application process block 302, which includes glue lock/glue list information 362. When the debugger control block 303 receives a debugging request from a user, it builds the request into the glue block 318 associated with the request.

In the example of FIG. 3, the debugger control block 303 builds the request into glue block 318. The glue block 318 also includes information such as (but not limited to) the identity of the previous and next glue block 316, 318 in the glue list 362 and any events created by the control program 322. The control program receives the request message from the debugger control block 303 and creates the PER bracket as discussed above. When an event occurs such as a breakpoint, the control program 322 creates an event message and places this message into the glue block 318. As the debugger control block 303 cycles through the glue blocks 314, 316, 318, 319, 321, the debugger control block 303 selects glue block 318. The debugger control block 303 determines that an event is associated with the corresponding thread 312 and notifies the user.

Operation Flow for Multi-Threaded Application Debugging

Figure 4:
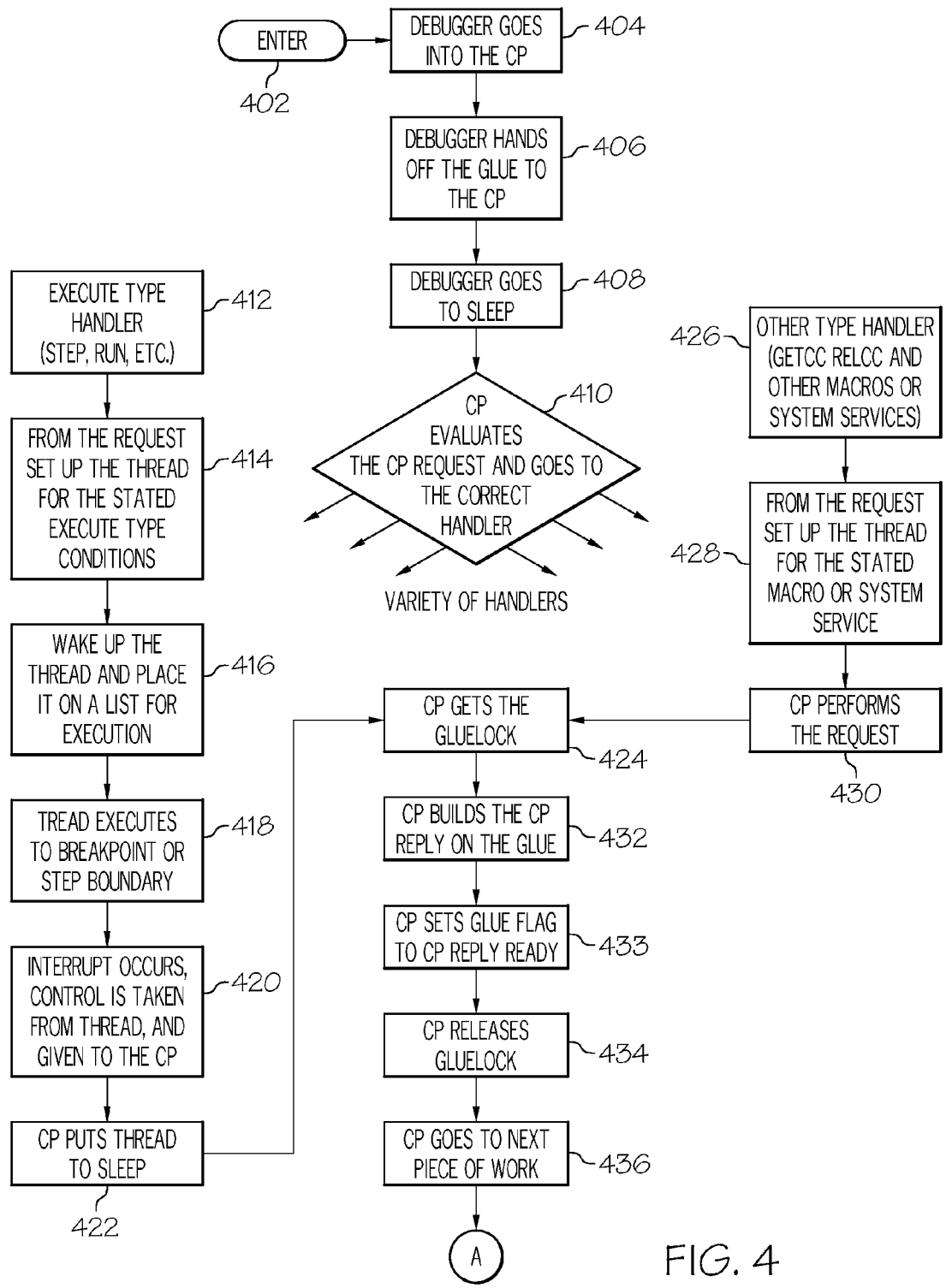
FIGS. 4-5 are operational flow diagrams illustrating an overall process of debugging a multi-threaded application according to one embodiment of the present invention.
Figure 5:
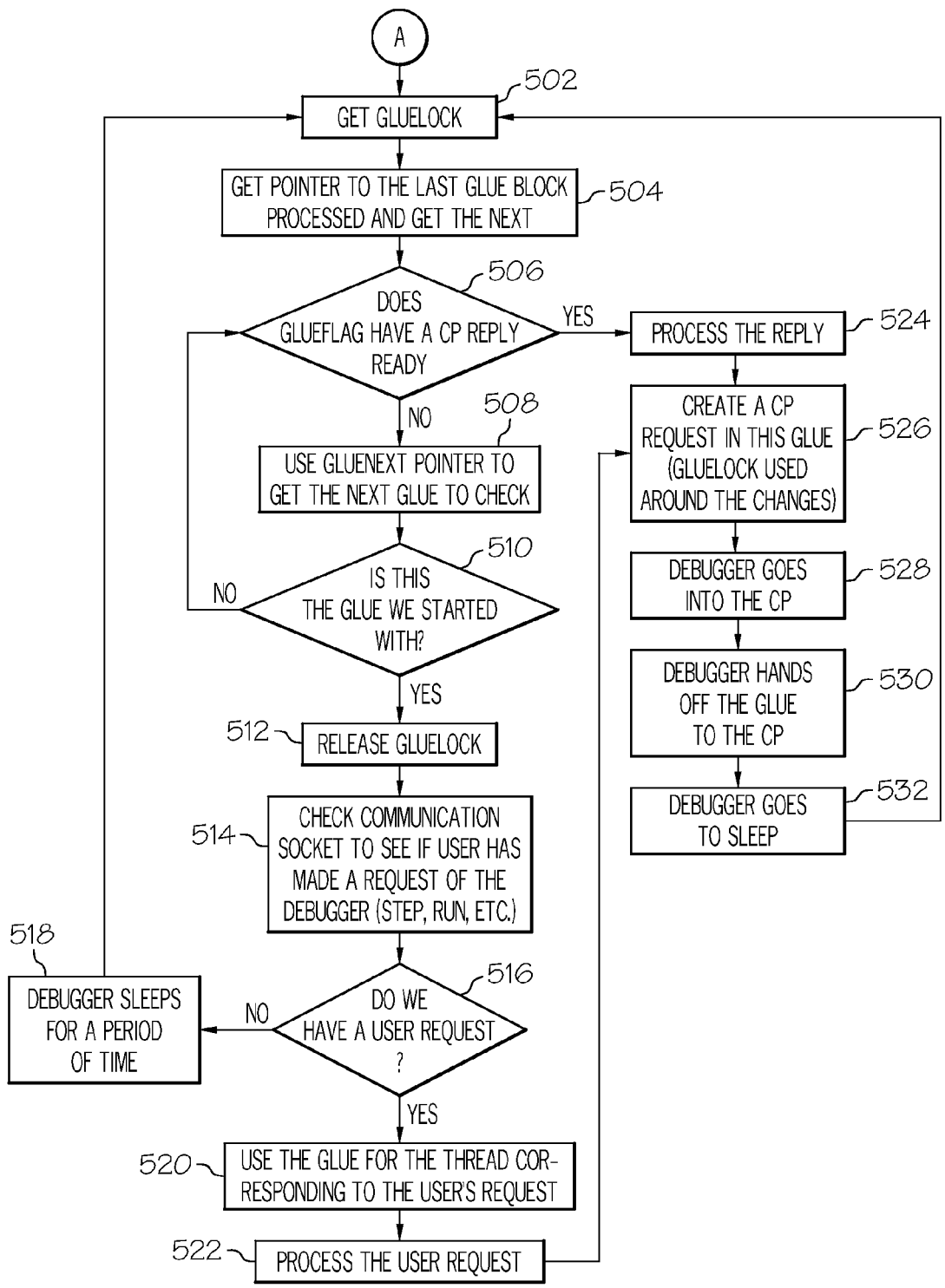

FIG. 4 and FIG. 5 are operational flow diagrams illustrating a process of debugging a multi-threaded application. The operational flow diagram of FIG. 4 begins at step 402 and flows directly to step 404. The debugger PCB 203, at step 404, initiates communication with the control program 122. For example, the debugger control block 203 has received a debugging request such as step, run, or any other debugging request from a user. The debugger control block 203 builds a request into the glue block 214 associated with the thread PCB 208 that the user is interested into.

The debugger control block 203, at step 406, hands-off the glue block 214 to the control program 122. The debugger control block 203, at step 408, then goes to "sleep". The control program 122, at step 410, evaluates the request in the glue block 314 and identifies the appropriate handler for the request. The control program 122, at step 412, executes the appropriate handler (e.g., a step handler, a run handler, etc.). The control program 122, at step 414, based on the request submitted by the debugger control block 203, sets up the thread PCB 208 for the stated execute type conditions. In other words, before a thread is woken up and let go, the control program 122 analyzes a glue block that came in and identifies a request from the debugger 203. The control program 122 then converts the request into an actual PER bracket. The control program 122, at step 416, wakes up the thread PCB 208 and places it on a list 206 for execution. This list, for example, can be a list within a dispatcher (not shown). A debugging event, at step 418, occurs such as the thread PCB 208 executing to breakpoint or step boundary (PER bracket). An interrupt, at steps 420, occurs and the control program 122 takes control and places the thread PCB 208 to "sleep" at step 422. The control then flows to step 424.

Returning back to step 410, other type handlers such as getcc, relcc, and other macros or system services can be selected at step 426. Based on the request within the glue block 214, the control program 122, at step 428, sets up the thread PCB 208 for the stated macro or system service. The control program 122, at step 430, performs the request. The control program 122, at step 424, retrieves the glue lock 204 for synchronizing updates to the glue blocks 214, 216, 218. The control program 122, at step 432, builds the control program reply on the glue block 214 (i.e., event message). The control program 122, at step 434, sets the GlueFlag to "control program reply ready" so that the debugger control block 203 can identify that debugging event information exists within the glue block 214. This information is associated with the debugging event that has occurred at step 418. The control program 122, at step 436, releases the glue lock 204. The control program 122, at step 438, continues onto the next piece of work. The control flows to entry point A of FIG. 5 where the debugger control block 203 detects that the Glue-Flag is set to "control program reply ready".

The debugger control block 203, at step 502, retrieves the glue lock 204. The debugger control block 203, at step 504, retrieves the pointer to the last glue block processed and the next glue block to be processed. The debugger control block 203, at step 506, determines if the GlueFlag includes the "control program reply ready" tag. If the result of this determination is negative, the debugger control block 203, at step 508, uses the GlueNext pointer to get the next glue block to check. For example, of the selected glue block is glue block 216, the debugger control block 203 selects the glue block 218. The debugger control block 203, at step 510, determines if the currently selected glue block 218 is the glue block that it started with (i.e., the glue block at the beginning of the glue block list 206). If the result of this determination is negative, the control flow returns to step 506. If the result of this determination is positive, the debugger control block 203, at step 512, releases the glue lock 204.

The debugger control block 203, at step 514, checks the communication socket to see if a user has made a request of the debugger 124 to perform a debugging operation such as step, run, and any other debugging operation. If the debugger control block 203, at step 516, determines that a user has not made a request, the control flows to step 518. The debugger control block 203, at step 518, the debugger "sleeps" for a given period of time since there are no glue replies from the control program 122 or debugging requests from the user. The control flow then returns to step 502. If the debugger control block 203, at step 516, determines that a user has requested a debugging operation, the debugger control block 203, at step 520, retrieves the glue block s16 for the thread that the user is interested in. The debugger control block 203, at step 522, processes the user request and the control flows to step 526. Returning to step 506, if the result of this determination is positive, the debugger control block 203, at step 524, processes the control program reply (event message).

The debugger control block 203, at step 526, creates as control program request in this glue block 314. It should be noted that the glue lock 204 is used around the changes. The debugger control block 203, at step 528, communicates with the control program 122. The debugger control block 203, at step 520, hands-off the glue to the control program 122 and goes to "sleep" at step 532. The control flow returns to step 502.

Non-Limiting Examples

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

What is claimed is:

1. A method for facilitating debugging of a multi-threaded application with a debugger, the method comprising:
   generating, with a debugger and based on receiving a debugging request, a control program request associated with at least one thread of a process that has been designated, as indicated by the debugging request, for debugging, wherein the control program request instructs the control program to perform at least one of an execute type action and a service type action on the thread, wherein the at least one of an execute type action and a service type action manipulates the thread, and wherein the debugger is configured to receive the debugging request from a user via a graphical user interface;
   placing the control program request into a memory buffer associated with the thread, wherein a memory buffer is separate and distinct from a thread;
   passing the memory buffer to a control program, wherein the control program performs one or more control functions of an operating system;
   monitoring a plurality of memory buffers, wherein each memory buffer in the plurality of memory buffers is associated with a different thread of the process;
   determining, based on the monitoring, whether at least one memory buffer in the plurality of memory buffers includes debugging event information from the control program, wherein the debugging event information is at least based on the thread being manipulated by an action performed by the control program on the thread; and
   processing, based on determining that at least one memory buffer in the plurality of memory buffers includes debugging event information from the control program, the debugging event information, wherein the processing includes at least one of
   notifying a user of the debugging event information, and
   automatically generating at least one control program request for a thread associated with the at least one memory buffer.

2. The method of claim 1, further comprising:
   receiving at least one debugging request from the user associated with the at least one thread of the process;
   performing the debugging request received from the user on the at least one thread; and
   notifying the user of a result associated with performing the debugging request on the at least one thread.

3. The method of claim 1, further comprising:
   determining, based on to the monitoring, that at least one memory buffer in the plurality of memory buffers fails to include debugging event information from the control program; and
   transitioning, based on to determining that at least one memory buffer in the plurality of memory buffers fails to include debugging event information from the control program, into a dormant state.

4. The method of claim 1, further comprising:
   determining, based on to the monitoring, that at least one memory buffer in the plurality of memory buffers fails to include debugging event information from the control program; and
   performing, based on determining that at least one memory buffer in the plurality of memory buffers fails to include debugging event information from the control program, at least one of:
      freeing-up at least one of a memory table and system resources that have been previously allocated; and
      processing messaging functionalities.

5. The method of claim 2, wherein performing the debugging request received from the user on the at least one thread, further comprises:
   automatically generating an additional control program request for at least one additional thread;
   automatically placing the additional control program request in a memory buffer associated with the at least one thread; and
   automatically passing the memory buffer to the control program.

6. The method of claim 1, further comprising:
   generating a plurality of control program requests associated with the at least one thread;
   placing each of the plurality of control program requests into the memory buffer associated with the at least one thread; and
   passing the at least one memory buffer to the control program.

7. The method of claim 1, further comprising:
   generating at least one separate control program request associated with a plurality of threads;
   placing the at least one separate control program request for each thread in the plurality of threads into a separate memory buffer associated with each thread; and
   passing each separate memory buffer to the control program.

* * * * *